Patented Jan. 3, 1950

2,493,009

UNITED STATES PATENT OFFICE 2,493,009

PREPARATION OF PENTACHLOROCYCLO-PENTENONE

Earl T. McBee and Jack S. Newcomer, West Lafayette, Ind., assignors to Purdue Research Foundation, Lafayette, Ind., a corporation of Indiana No Drawing. Application June 28, 1947,
Serial No. 757,949

11 Claims. (Cl. 260—586)

The present invention relates to a novel process for the preparation of 2,3,4,4,5-pentachloro-2-cyclopentenone, having the molecular formula:

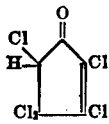

and having a melting point of 82–83 degrees centigrade. The invention more particularly relates to a method whereby 2,3,4,4,5-pentachloro-2-cyclopentenone may be produced in high yields from hexachlorocyclopentadiene, $C_5Cl_6$, by a single-step process.

It is an object of the present invention to provide a novel process for the production of 2,3,4,4,5-pentachloro-2-cyclopentenone. A further object of the invention is to provide a single-step process for the production of 2,3,4,4,5-pentachloro-2-cyclopentenone in high yields from hexachlorocyclopentadiene. Another object of the invention is to provide a process for the production of 2,3,4,4,5-pentachloro-2-cyclopentenone of high purity. Other objects of the invention will become apparent hereinafter.

It has now been found that the foregoing and additional objects may be accomplished, and 2,3,4,4,5-pentachloro-2-cyclopentenone of high purity obtained in excellent yields directly from hexachlorocyclopentadiene. The invention essentially comprises heating together, at a temperature between about 60 and 95 degrees centigrade, and preferably between about 75 and 90 degrees centigrade, hexachlorocyclopentadiene and concentrated sulfuric acid. The reaction is preferably continued until the attainment of a single-phase system, and then discontinued immediately or shortly thereafter, inasmuch as optimum yields of the desired product, 2,3,4,4,5-pentachloro-2-cyclopentenone, are then obtained. Also, the crude product from a reaction conducted in such a manner is of high purity. A convenient way of discontinuing the reaction is by chilling the reaction product, as by quenching in cold water or by pouring onto cracked ice.

The sulfuric acid employed in the method of the present invention has a concentration ordinarily greater than about 50 per cent, and usually of a concentration in excess of of 80 per cent. The reaction time is considerably reduced by employment of acid of higher concentration. When acids of concentration less than 50 per cent are used, the reaction rate is ordinarily too low to be of practical value.

The reaction temperature is a very important and critical factor in performing the present invention. Temperatures below about 60 degrees centigrade are not generally productive of a satisfactory reaction rate, while, at temperatures above about 95 degrees centigrade, excessive quantities of undesirable byproducts, in some instances including even tars, are formed. However, temperatures of 60 to 95 degrees centigrade are satisfactory, with temperatures between about 75 to 90 degrees centigrade being especially preferred due to the high yields of desired product obtainable by operating within the said range.

For optimum results, the hydrolysis should be continued until the mixture of reaction products exists as a single phase. As introduced into the reaction zone, the hexachlorocyclopentadiene and sulfuric acid are immiscible and resolve into two layers. Upon agitation of the mixture during the reaction period, which is desirable to ensure a satisfactory contact of the reactants, the two layers gradually resolve into a single layer or phase. Conversions and yields as high as 80 per cent may be obtained by discontinuing the reaction as soon as only a single phase is present, and purity of the crude product is highest at this point. However, good conversions are obtainable by allowing the reaction to proceed for longer periods of time.

The time required for the reaction is usually between about six and twelve hours, depending upon concentration of the acid, efficiency of agitation, and the temperature employed. If desired, a suitable emulsifying agent may be employed to cause more efficient contact of the reactants. The mole ratio of acid to hexachlorocyclopentadiene is not critical, but may be conveniently maintained between about 1 to 1 and 6 to 1.

The objectives of the present invention are most readily accomplished only when efficient contact of the reactants is provided. Without stirring or other agitation, the high yields and purity of the desired 2,3,4,4,5-pentachloro - 2 - cyclopentenone can not ordinarily be realized. This agitation may take any desired form, such as stirring, shaking, et cetera, but is considered requisite in the preferred manner of conducting the reaction.

The following examples are given to illustrate the practice of the invention, but are not to be construed as limiting.

*Example 1.—Hydrolysis of hexachlorocyclopentadiene*

A mixture of 200 grams of hexachlorocyclopentadiene, $C_5Cl_6$, and 600 grams of technical concentrated sulfuric acid (93 per cent) was vigorously agitated for 8 hours at a temperature of 80 to 90 degrees centigrade. The solid product obtained by pouring the cooled reaction mixture onto cracked ice was recrystallized from petroleum ether to give 153 grams (78 per cent conversion and yield) of 2,3,4,4,5-pentachloro-2-cyclopentenone, a white crystalline solid melting at 82–83 degrees centigrade.

The 2,3,4,4,5-pentachloro-2-cyclopentenone was first shown to be a cyclopentenone by conversion to octachloro-3a,4,7,7a-tetrahydro-4,7-methanoindene-1,8-dione with potassium iodide, preferably in acetone solution. The position of the hydrogen atom was established by conversion with room-temperature liquid-phase bromination to 5-bromo-2,3,4,4,5-pentachloro-2-cyclopentenone, a yellow oil having a melting point of about 3 to 4 degrees centigrade, and thence to 5-bromo-2,3,4,5-tetrachloropentadienoic acid, a white solid having a melting point of 118 to 119 degrees centigrade, by treatment with alkali (KOH) and subsequent acidification (HCl). The same monobromo acid was obtained by brominating tetrachloro-5,5-dimethoxycyclopentadiene (the structure of which was established by hydrolysis with concentrated sulfuric acid to form the reactive tetrachlorocyclopentadienone, which immediately dimerized with the production of octachloro - 3a,4,7,7a - tetrahydro - 4,7 - methanoindene-1,8-dione, a known compound) at room temperature in the liquid phase, treating the resulting product with concentrated sulfuric acid to form a dibromotetrachlorocyclopentenone (a white solid which liberates a gas at its melting point of about 156 degrees centigrade), treating this ketone with alkali, and subsequently acidifying. The acid produced in this manner has the bromine atom fixed on the terminal carbon atom. As the acid produced in both cases is the same, the position of the bromine atom is fixed in 5 - bromo - 2,3,4,4,5 - pentachloro - 2 - cyclopentenone, and thus also the position of the hydrogen in 2,3,4,4,5-pentachloro-2-cyclopentenone.

The 2,3,4,4,5 - pentachloro - 2 - cyclopentenone prepared as above did not depress the melting point of the compound prepared as directed by Zincke and Meyer, Ann. 367, 7 (1909), and had a calculated chlorine per cent of 69.7, found 69.6; M. W. calcd. 254, M. W. found 257.

*Example 2*

The procedure of Example 1 was repeated, using instead 814 grams of hexachlorocyclopentadiene and 1600 grams of concentrated sulfuric acid (93 per cent). A 78 per cent yield of the desired 2,3,4,4,5-pentachloro-2-cyclopentenone was obtained also in this instance.

The compound 2,3,4,4,5-pentachloro-2-cyclopentenone may be brominated in the liquid phase at or about room temperature to 5-bromo-2,3,4,4,5-pentachloro-2-cyclopentenone, a compound of the formula:

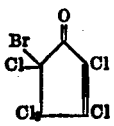

which may then be dehydrochlorinated with a base, e. g., KOH, and subsequently acidified to produce the compound 5-bromo-2,3,4,5-tetrachloropentadienoic acid, having the formula $BrClC=CCl-CCl=CCl-COOH$.

The ketone, 2,3,4,4,5-pentachloro-2-cyclopentenone, is considerably more soluble in non-polar organic solvents than impurities which are obtained in appreciable quantities when the reaction is conducted at higher temperatures, and may conveniently be separated from the said impurities by extraction of the product, usually in the sulfuric acid solution thereof, with such a non-polar solvent, e. g., chloroform, carbon tetrachloride, or petroleum ether (50–100 degrees centigrade).

Various modifications may be made in the invention without departing from the spirit or scope thereof, and it is to be understood that we limit ourselves only as defined in the appended claims.

We claim:
1. The process which includes: heating together, at a temperature between about 60 and 95 degrees centigrade, hexachlorocyclopentadiene and concentrated sulfuric acid of less than 100 percent concentration, to convert said hexachlorocyclopentadiene to 2,3,4,4,5-pentachloro-2-cyclopentenone.
2. The process of claim 1, wherein the reaction mixture is agitated.
3. The process of claim 1, wherein the temperature is maintained between about 75 and 90 degrees centigrade.
4. The process of claim 1, wherein 2,3,4,4,5-pentachloro-2-cyclopentenone is separated from the reaction product.
5. The process of claim 1, wherein the mole ratio of sulfuric acid to hexachlorocyclopentadiene is between about 1 to 1 and 6 to 1.
6. The process which includes: heating together, at a temperature between about 60 and 95 degrees centigrade, hexachlorocyclopentadiene and concentrated sulfuric acid of less than 100 percent concentration until attainment of a single phase.
7. The process which includes: heating together, with agitation, at a temperature between about 60 and 95 degrees centigrade, hexachlorocyclopentadiene and sulfuric acid of at least about 80 and less than 100 per cent concentration, until attainment of a single phase, and then discontinuing the reaction and separating pentachlorocyclopentenone from the reaction product.
8. The process which includes: heating together, with agitation, at a temperature between about 75 and 90 degrees centigrade, hexachlorocyclopentadiene and sulfuric acid of at least about 80 and less than 100 per cent concentration, until attainment of a single phase, and separating the reaction product.
9. The process which includes: heating together, with agitation, at a temperature above about 90 degrees centigrade, hexachlorocyclopentadiene and sulfuric acid of at least about 80 and less than 100 per cent concentration, until the attainment of a single phase, and until conversion of at least about 50 per cent of the hexachlorocyclopentadiene to 2,3,4,4,5-pentachloro-2-cyclopentenone, and stopping the reaction substantially at the attainment of the single phase.
10. The process which includes: heating together, with agitation, hexachlorocyclopentadiene and concentrated sulfuric acid of concentration less than 100 per cent, until attainment of a single phase, and discontinuing the reaction substantially immediately upon attainment thereof.

11. The method of claim 10, wherein the 2,3,4,4,5-pentachloro-2-cyclopentenone is extracted from the sulfuric acid solution with a non-polar organic solvent.

EARL T. McBEE.
    JACK S. NEWCOMER.

REFERENCES CITED

The following references are of record in the file of this patent:

UNITED STATES PATENTS

| Number | Name | Date |
| --- | --- | --- |
| 1,849,844 | Lloyd | Mar. 15, 1932 |
| 2,284,467 | Ballard | May 26, 1942 |

OTHER REFERENCES

Zincke et al., Annalen, vol. 367, pages 1–13 (1909).